(12) United States Patent
Shin

(10) Patent No.: US 10,582,275 B2
(45) Date of Patent: Mar. 3, 2020

(54) REAL-TIME DIGIT STRING-BASED INFORMATION DISTRIBUTION SYSTEM USING SMART TERMINAL AND METHOD THEREOF

(71) Applicant: The SYG Institute Co., Ltd., Seoul (KR)

(72) Inventor: Yong Gyun Shin, Seoul (KR)

(73) Assignee: The SYG Institute Co., Ltd., Seoul (KR)

( * ) Notice: Subject to any disclaimer, the term of this patent is extended or adjusted under 35 U.S.C. 154(b) by 0 days.

(21) Appl. No.: 15/298,061

(22) Filed: Oct. 19, 2016

(65) Prior Publication Data

US 2017/0134777 A1     May 11, 2017

Related U.S. Application Data

(60) Provisional application No. 62/253,940, filed on Nov. 11, 2015.

(51) Int. Cl.

| | |
|---|---|
| *H04N 21/232* | (2011.01) |
| *H04N 21/84* | (2011.01) |
| *H04N 21/81* | (2011.01) |
| *G06F 16/48* | (2019.01) |
| *G06F 16/783* | (2019.01) |
| *H04N 21/482* | (2011.01) |
| *H04N 21/4788* | (2011.01) |

(Continued)

(52) U.S. Cl.
CPC .............. *H04N 21/84* (2013.01); *G06F 16/48* (2019.01); *G06F 16/783* (2019.01); *H04N 21/4722* (2013.01); *H04N 21/4784* (2013.01); *H04N 21/4788* (2013.01); *H04N 21/4828* (2013.01); *H04N 21/812* (2013.01); *H04N 21/8352* (2013.01); *H04N 21/232* (2013.01)

(58) Field of Classification Search
CPC .................................................... H04N 21/232
See application file for complete search history.

(56) References Cited

U.S. PATENT DOCUMENTS

| | | | | |
|---|---|---|---|---|
| 2009/0177301 | A1* | 7/2009 | Hayes | G11B 19/025 700/94 |
| 2015/0170218 | A1* | 6/2015 | Rao | G06Q 30/0269 705/14.66 |
| 2015/0281785 | A1 | 10/2015 | Jeon et al. | |

FOREIGN PATENT DOCUMENTS

| | | |
|---|---|---|
| EP | 1227680 A1 | 7/2002 |
| JP | 11-265398 | 9/1999 |

(Continued)

*Primary Examiner* — Michael H Hong

(74) *Attorney, Agent, or Firm* — Greer Burns & Crain Ltd.

(57) ABSTRACT

The information distribution system according to the present disclosure includes a theme digit string registration unit which receives a registration request of a theme digit string by a theme of the content and stores and registers the received theme string in a digit string DB, a content registration unit which receives a registration request of theme digit string and content matched to the theme digit string, matches the received theme digit string and content and stores the same in a content DB, and an information distribution management unit which receives a provision request of the content including the digit string, retrieves the content matched to the theme digit string from the content DB, and transmits the retrieved content to the smart terminal, to manage provision of the information distribution service.

25 Claims, 15 Drawing Sheets

(51) Int. Cl.
*H04N 21/8352* (2011.01)
*H04N 21/4784* (2011.01)
*H04N 21/4722* (2011.01)

(56) References Cited

FOREIGN PATENT DOCUMENTS

| | | |
|---|---|---|
| KR | 10-2004-0083238 | 10/2004 |
| KR | 1005124950000 | 9/2005 |
| KR | 10-2010-0048724 | 5/2010 |
| KR | 10-0965455 | 6/2010 |
| KR | 10-2012-0076978 | 7/2012 |
| KR | 1014930880000 | 2/2015 |
| KR | 10-2015-0122577 | 11/2015 |
| WO | 2013172660 A1 | 11/2013 |
| WO | 2014208860 A1 | 12/2014 |
| WO | 2015100496 A1 | 7/2015 |

\* cited by examiner

FIG. 3

| Theme digit string | Description information |
|---|---|
| 114 | Basic telephone directory guide providing information of telephone, location, business name, manager etc. |
| 64 | Online community between voters and candidates for discussing on various political info, policy, issue, news etc |
| 5050 | 50% off and half price information of online sites, products, sellers, reviews etc. |
| ⋮ | ⋮ |

Candidates meeting

Smart input: 2014-05-13 23:20:56

Candidates agreed on Hope policy for economy and welfare

REAL-TIME DIGIT STRING-BASED INFORMATION DISTRIBUTION SYSTEM USING SMART TERMINAL AND METHOD THEREOF

This application claims priority to U.S. Provisional Patent Application No. 62/253,940 filed on Nov. 11, 2015, the entirety of which incorporated herein by reference.

TECHNICAL FIELD

The present disclosure relates to information distribution technology, and more particularly, to an information distribution system and an information distribution method that provides various types of content distribution services for managing various information processing based on a digit string by providing smart terminal users with the digit string and information associated with the digit string.

BACKGROUND ART

In the information age of big data in which anyone can be an information creator and an information consumer, we are flooded with information. In the flood of information, for each information, its value is important but comprehensive distribution covering propagation, access, use and distribution of information is also important. That is, it is as much important to manage the distribution of information efficiently, timely and accurately in real time as to produce good information.

Take an information search process as one example. Assume that a user inputs "restaurants near the city hall offering 50% off today only" in a search window. An advantage of inputting a natural language query in the search window is that the user does not need to struggle to select a keyword. Instead, a search engine needs to select at least one keyword through natural language analysis and search, and conduct a complex search using the selected keyword. In this instance, in the case where a plurality of keywords is selected, because the search engine does not know which keyword is a main keyword, the search engine conducts a search using each combination of keywords and produces search results. When the user is provided with the produced search results, the user may not be satisfied with the search results because the search results do not meet the search goal. The advantage is accompanied by a disadvantage that the user needs to input another natural language or select and input an important keyword and repeat a search. That is, despite the advantage, a natural language search has two sides, a good side and a bad side, due to the disadvantage.

Here, assume that information of "50% off today only" exists as a separate digit string corresponding to an access address and a key, when the user conducts a search using the corresponding digit string for region "city hall", and particulars "delicious restaurants" and "restaurants", the user can access information matched timely and accurately in an easier, more convenient and quicker manner than a natural language search. Also, if there is a digit string of a content provider corresponding to a type of access key that can be used to identify and distinguish an object, information is registered based on the digit string, and information corresponding to the digit string can be accessed easily and quickly. This digit string-based information access method corresponds to information distribution technology with improved timeliness and accuracy.

Also, because digit strings do not require interpretation, there is no problem with global distribution of content related to digit strings beyond national borders. When search processing in an information access method is performed based on a digit string system, in the similar way, registration processing in the information access method may be also performed based on the digit string system. Thus, users over the world can register and access matching information classified timely and accurately by using digit strings irrespective of time, place and language. Also, for propagation or information delivery using existing media such as newspaper and broadcast, when the corresponding digit string is exposed and the exposed digit string becomes access information, updated related information registered and changed in real time using smart terminals can be provided in real time through media and communication convergence.

RELATED LITERATURES

Patent Literature

Korean Patent No. 10-0965455 (Jun. 15, 2010)

DISCLOSURE

Technical Problem

The present disclosure is designed under recognition of the related art such as the above, and an object of the present disclosure is to provide an information distribution system and an information distribution method that supports information distribution processing to allow digit string-based real-time registration, search, retrieval and communication of information with timeliness, accuracy, and matching (making up for miss matching) according to a matching relationship between a digit string and information.

Another object of the present disclosure is to support smooth information communication of users by integrated convergence of calls, texts, SNSs, and e-mails corresponding to the delivery method of digit string-based information distribution processing for sequential selection depending on a situation of a receiver according to the need.

The present disclosure provides users with an information distribution service involving the digit string-based information communication and charges the service users for the service, and enables each first content to systematically distribute a plurality of second content relayed to the first content and gives a reward for a user of the first content having distributed the second content.

Also, when an information distribution service involving the digit string-based information communication is provided to advertisers or information givers of existing media such as newspaper and broadcast, there are quantitative and qualitative limitations in providing information due to the limited space and time of media, and to overcome the limitations, after a digit string is exposed through media and communication, a real-time information registration and retrieval service is provided to a smart terminal based on the exposed digit string.

Technical Solution

To achieve the above objects, a real-time digit string-based information distribution system using a smart terminal according to the present disclosure is an information distribution system which provides smart terminals with an information distribution service of content using a digit string exposed through a medium as access information of the content, and includes an information distribution server including a theme digit string registration unit which receives registration of a theme digit string that identifies each content theme, a content registration unit which receives registration of the theme digit string and a content digit string that is matched to the theme digit string and identifies content, and content identified by the content digit string, and an information distribution management unit which after the registered digit string is exposed through the medium, receives a search request of the content including the exposed digit string from the smart terminal, searches for content using the received digit string as an access key, and transmits information of the found content to the smart terminal, to manage provision of the information distribution service.

Here, the theme digit string registration unit further receives registration of description information describing a theme for the theme digit string, and stores the description information in the digit string DB.

According to an aspect of the present disclosure, the content registration unit receives a registration request of the content including the content digit string and further including at least one of a region, a keyword, a title, content, and a user contact address of content, and stores the received content in a content DB.

Here, the content registration unit receives registration of at least one of a telephone number, an e-mail address, an Internet address and a SNS (Social Network Service) address as the contact address, and stores the same in the content DB.

Also, the content registration unit receives registration of a plurality of telephone numbers of user, receives registration of call connection ranking for each telephone number, and when a call connection to a first-ranking telephone number fails, makes an automatic call connection to a second-ranking telephone number.

Further, the content registration unit receives registration of content further including a contact address available for immediate communication of user having registered the content, and provides immediate communication of the user by the contact address available for immediate communication.

Preferably, the information distribution server further includes a user location management unit to receive location information from the smart terminal having a location identifying function, and provide the received location information and business location information of the user through a map included in the content.

According to another aspect of the present disclosure, the information distribution management unit processes at least one of the functions of: receiving a search request by receiving the theme digit string from the smart terminal, searching for at least one content matched to the requested theme digit string from the content DB, and providing a list of found content as a search result; receiving a search request by receiving the content digit string, searching for the content identified by the requested content digit string from the content DB and providing a search result; and receiving a search request including the theme digit string and further including at least one of a keyword and a region, searching for at least one content matched to information requested for search from the content DB, and providing a list of found content as a search result.

Here, the information distribution management unit receives a retrieval request of the content registered in real time from the smart terminal, retrieves the corresponding content from the content DB, and provides a list of the retrieved content as a search result.

Also, when the information distribution management unit receives a retrieval request of individual content from the smart terminal, the information distribution management unit searches for content information including a content digit string registered for the content, and further including at least one of a region, a keyword, a title, content, and a contact address of user from the content DB and provides the same.

Preferably, the information distribution server further includes a connection relay charging unit which receives a connection request by receiving selection of a contact address of the content from the smart terminal having retrieved the information of the content, intermediates communication connection to the contact address, and charges for a cost of the connection intermediation.

Also, the information distribution server further receives registration of other content that is inserted in display information of the content to display link information and linked by selection of link information, for the content, as a relaying content.

Here, the information distribution server further includes a connection relay rewarding unit which rewards of a predetermined cost to a high-level content user having registered the relaying content, when the content intermediated communication connection to a contact address by a connection request of the smart terminal is the relaying content linked by selection of the link information.

According to another aspect of the present disclosure, the information distribution system further includes a smart terminal having a display configuration including a digit string window for providing digit string search and digit string input of user, a region window for receiving selection of a region of content, and a keyword window for receiving input of a keyword of content, wherein the smart terminal transmits a search request of content including a digit string inputted in the digit string window to the information distribution server using the display configuration, receives a search result from the information distribution server, and executes an application.

An information distribution system according to another embodiment of the present disclosure is an information distribution system which provides smart terminals having a TV function with an information distribution service of content using a digit string as access information of the content, and includes an information distribution server including a theme digit string registration unit which receives a registration request of a theme digit string by a theme of the content and stores and registers the received theme string in a digit string DB, a content registration unit which receives a registration request of the theme digit string and the content matched to the theme digit string, matches the received theme digit string and content and stores the same in a content DB, and an information distribution management unit which receives a provision request of the content including the theme digit string from the smart terminal, retrieves information of the content matched to the transmitted theme digit string from the content DB, generates a list of content using the retrieved information of the content, transmits the generated list of content to the smart terminal, receives a provision request of content selected from the list of content, and transmits the requested content to the smart terminal, to manage provision of the information distribution service including playing of the content.

Here, the information distribution system further includes a smart terminal having a display configuration including a TV area where a program of TV broadcast is outputted in real time, a digit string area where content designated by user and a digit string of content related to the program is outputted, an advertising digit string area where a digit string of an advertising content is outputted, a region window where selection of a region of content is received, a keyword window where input of a keyword of content is received, a content area where a list of content matched to a combination of a digit string selected in the digit string area or the advertising digit string area, a region selected in the region window and a keyword selected in the keyword window is received from the information distribution server and outputted, and when any one content is selected from the outputted list, provision of the selected content is requested to the information distribution server, and a digit string advertising area where video advertising information of a digit string received from the information distribution server is outputted, and playing of a video advertisement is requested to the information distribution server by selection of user, wherein the smart terminal provides the information distribution service using the display configuration, receives content selected in the content area or the digit string advertising area from the information distribution server and executes an application that provides an output to a screen.

Also, the content registration unit receives registration of a digit string and content matched to the digit string from a smart phone of user, and the information distribution management unit provides registered content in real time by request of the smart terminal.

To achieve the object, an information distribution method according to the present disclosure is an information distribution method in which an information distribution server provides an information distribution service of content to smart terminals and includes (a) a theme digit string registering step of receiving a registration request of a theme digit string by a theme of the content and storing and registering the received theme string in a DB, (b) a content registering step of receiving a registration request of the theme digit string and at least one content matched to the theme digit string and storing the received theme digit string and content in the DB, and (c) an information distribution managing step of receiving a provision request of the content including the theme digit string from the smart terminal, retrieving content matched to the received theme digit string from the DB, and transmitting the retrieved content to the smart terminal, to manage provision of the information distribution service.

ADVANTAGEOUS EFFECTS

According to one aspect of the present disclosure, when a digit string-based information distribution service is provided, a unique theme formed by a combination of at least one keyword is defined as one digit string, and by use of the defined digit string, users can access and manage the digit string and various information matched to the meaning.

According to another aspect of the present disclosure, contact between users is intermediated through various contact channels and communication methods to enable immediate communication of information between the users, contributing to the added value enhancement through that.

Also, information communication between users with high timeliness and probability of success allows a proper charging and reward service to be provided to the service users, thereby expanding an information delivery route, and enables systematic cooperation and competition of registers having registered digit string-based information, making the relevance of information closer.

Also, according to still another aspect of the present disclosure, to remove the quantitative and qualitative limitations in providing information to existing media advertisers or information givers using newspaper and broadcast due to the limited space and time of media, when a theme digit string or content digit string is exposed to media, information is provided in real time based on the exposed digit string by using a smart terminal, so propagation and information delivery effect is maximized at the right time.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 3 is a schematic diagram showing an example of a theme digit string managed by an information distribution server of FIG. 1.

MODE FOR CARRYING OUT THE INVENTION

Figure 1:
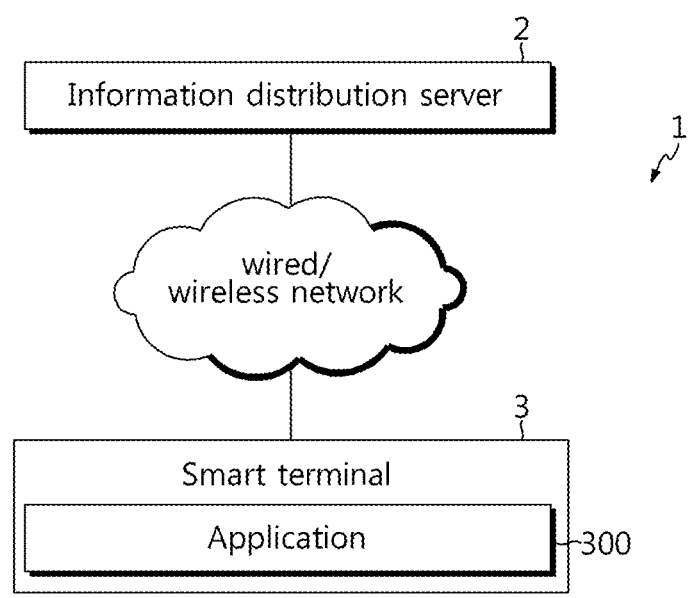
FIG. 1 is a schematic diagram showing the architecture of an information distribution system according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments disclosed herein and illustrations shown in the drawings are just the most preferred embodiment of the present disclosure and do not represent all the technical aspects of the present disclosure, so it should be understood that other equivalents and modifications would be made as alternatives at the time the present application was filed.

<1. System Architecture>

FIG. 1 is a schematic diagram showing the architecture of an information distribution system 1 according to an embodiment of the present disclosure.

The information distribution system 1 according to an embodiment of the present disclosure is built based on a wired/wireless network, and is configured to include an information distribution server 2 that provides an information distribution service to smart terminals 3 and a smart terminal 3 that receives the information distribution service.

The wired/wireless network in the present disclosure covers all communication networks capable of Internet data communication using various protocols, typically, for example, a wired/wireless public network such as a mobile communication network and an Internet, or a private network.

The information distribution service in the present disclosure corresponds to a service that integrates information management and information processing involving registration, retrieval, correction and deletion of information. From the viewpoint of information distribution service users, a user may be an information consumer and an information provider. A series of information distribution services which lead to exchange, sharing, production and consumption through information communication between users correspond to an information communication service.

The information distribution server 2 offers the information distribution service that receives registration of information from the smart terminals 3 and provides information to the smart terminals 3 based on a digit string. The digit string corresponds to a serial number composed of a plurality of numbers. Advantages of the digit string are that it does not need interpretation and represents a single meaning. A conventional digit string is used to store and process data without intervention by a user, while the digit string of the present disclosure is generated by a user to classify and identify information of content, and is used as access information to search and access information of content by intervention of the user.

Here, the digit string is identification information for identifying the subject and the content of information matched to the digit string and access information for accessing the information. In the case of digit string "5050", a user identifies the content and the meaning of a word (e.g., "50% off") or a sentence (e.g., "delicious restaurants near the city hall offering 50% off today only") matched to the digit string through identifiability of the digit string "5050". Also, the user is provided with the matched information using the digit string as access information, such as an access address, an access channel and an access key, through accessibility of the digit string.

The digit string may include a theme digit string and a content digit string. The theme digit string corresponds to a digit string in theme and category representing a plurality of information. The theme digit string is for classifying information or identifying the purpose of information, and the theme digit string may become a parent node and be matched to each low-level digit string and content corresponding to a plurality of child nodes. Here, the low-level digit string includes a theme digit string and a content digit string. That is, a parent node, a theme digit string, may be matched to at least one of a theme digit string, a content digit string and content as a child node.

The content digit string is identification information of content registered by a user for the purpose of information distribution, advertising, and sharing. The content refers to an information access subject composed of at least one information. The content digit string and the content have a one-to-one matching relationship. For example, the content digit string such as a telephone number composed of numbers or URL can identify the content. When the content digit string is registered, a user can directly access a desired content through a content digit string search. In this case, the content digit string is preferably a telephone number personalized for each individual, but is not limited thereto.

The information distribution server 2 receives registration of various user contact addresses to support concurrent content distribution. The contact address corresponds to a contact channel address included in the content provided by the present disclosure. When it is assumed that a contact address is a mobile phone number, communication between users can be supported through calls and texts. The information distribution server 2 relays the content delivery in reliance on various communication methods accepted at a contact address which is used as an intermediary.

Also, to support immediate communication of information, the information distribution server 2 enables a user of the contact address to select an address available for immediate communication of information. For example, in the situation where a first user (a registering user who registered content) cannot make a call or receive a text, the first user may designate an e-mail address or an SNS address as an address of a contact channel available for immediate communication on the information distribution server 2. When a second user (a searching user who searches for the content of the first user) having searched for the content of the first user tries to contact the first user, the information distribution server 2 notifies, by priority, the second user of the e-mail address or SNS address designed as a contact channel available for immediate communication by the first user. Then, the second user selects the contact address of the first user notified by priority for immediate communication with the first user, and sends a message. That is, the first user designates the order of contact channels available for immediate communication according to his/her need.

The smart terminal 3 downloads, installs, and executes an application 300. Smart phones, smart pads, IP TVs, and smart TVs capable of executing the application 300 correspond to the smart terminal 3. Of course, computer terminals such as desktop computers and laptop computers also fall within the scope of the smart terminal 3 because they can execute the application 300. For example, assume that the smart terminal 3 is a computer terminal, an information distribution service is provided from the information distribution server 2 when the application 300 installed in the computer terminal is executed. The application 300 may be created as a web browser or may have a web browser function. Of course, the information distribution server 2 may build a web server and a home page to provide an information distribution service to the application 300.

Figure 2:
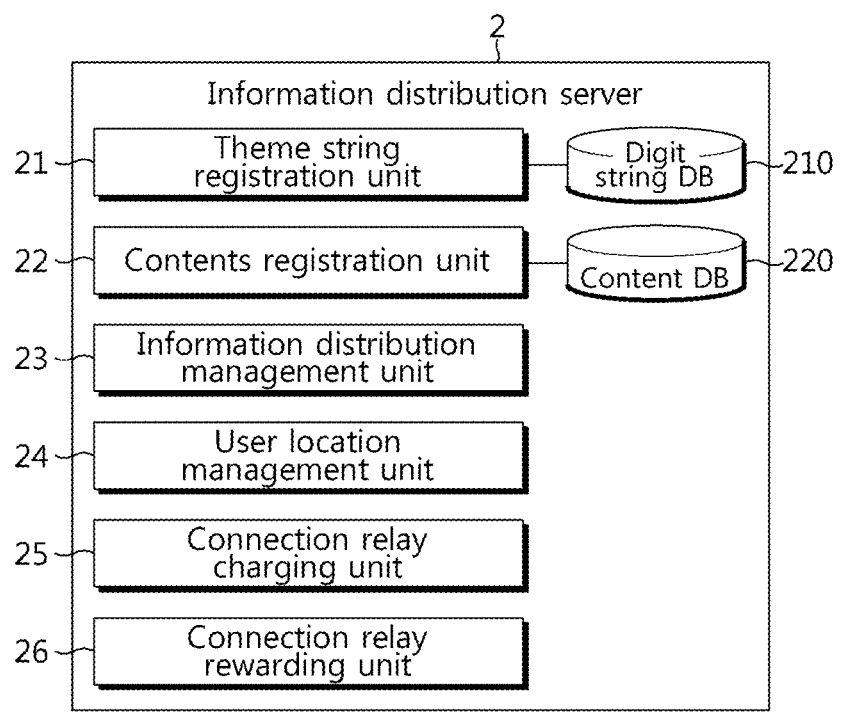
FIG. 2 is a schematic diagram showing an internal structure of an information distribution server of FIG. 1.

FIG. 2 is a schematic diagram showing an internal structure of the information distribution server 2 of FIG. 1.

The information distribution server 2 according to an embodiment of the present disclosure includes a theme digit string registration unit 21 to manage registered theme digit strings, a content registration unit 22 to receive registration of each content, and an information distribution management unit 23 to mediate an information distribution service of registered content and information communication between users.

Alternatively, the information distribution server 2 optionally may further include a user location management unit 24, a connection relay charging unit 25, and a connection relay rewarding unit 26.

The theme digit string registration unit 21 manages registration, retrieval, correction and deletion of a theme digit string corresponding to an identifier for information classification and access, using a digit string DB 210. The theme digit string is common information for identifying the main theme and the category of content and corresponds to an access key of the digit string DB 210. A user recognizes the main theme and the category through the theme digit string.

The theme digit string may be registered by an operator of the information distribution server 2 or by the request of the user. The theme digit string registration unit 21 receives registration of description information that describes the theme digit string and the content related to the theme of the theme digit string from the application 300 executed on the smart terminal 3, and stores the same in the digit string DB 210. The user can use the theme digit string in a semantically familiar manner after recognizing the description information of the theme digit string.

Here, when the theme digit string is registered in the digit string DB 210, the user becomes an information provider through the application 300 and may register at least one information of a digit string and information of content on low level by using the theme digit string as a parent node. Also, the user becomes an information consumer through the application 300, and may input a theme digit string and directly access each information corresponding to child nodes of the theme digit string.

The content registration unit 22 receives registration of information intended for a user to distribute as content from the application 300 and stores the same in a content DB 220. The content includes a content digit string, and includes at least one of a region, a keyword, a title, a content, and a user contact address of the content. That is, the content registration unit 22 receives registration of multimedia content in various formats without dependence on a particular format. For example, the content registration unit 22 may receive registration of multimedia data as content, or receive registration of content having a particular UI format. The content digit string corresponds to an identifier and a type of digit string key for access of the registered content. When it is assumed that the content digit string is a URL of a telephone number (e.g., a sequence of numbers on the telephone number), the telephone number URL is a special code of a service by which the content is provided, and is a telephone number on which contact with the user is made by telephone and corresponds to an Internet address having a link to a web page of the user. That is, the special code of a service is a digit string used to contact with the first user by the medium of the accessed content after the second user accesses the content of the first user.

Preferably, the content registration unit 22 receives setting of the theme digit string defined by the user and registration of the content from the application 300. The content registration unit 22 matches the set theme digit string to the content and stores it in the content DB 220. Then, the registered content is classified by the theme digit string. Of course, the content registration unit 22 may register at least one digit string of a theme digit string and a content digit string and content matched thereto in the content DB 220 according to a service policy.

Here, the content registration unit 22 may receive, from the application 300, registration of content including communication channel information, for example, a telephone number, an e-mail address, an Internet address and a Social Network Service (SNS) address, as information of the contact address. Then, using the application 300, the second user may select a particular communication channel of the first user and contact the first user in real time for communication in various aspects, such as, including retrieval, inquiry, purchase, agreement and reply of the content of the first user.

Further, for immediate delivery of information and successful communication, the content registration unit 22 may receive, from the application 300, registration of a content including a plurality of telephone numbers (e.g., a mobile number, an office telephone number, and a home telephone number) of the user and a call connection rank for each telephone number. Then, the application 300 of the user having retrieved the content may request a call connection to a first-ranking telephone number, and when the call connection fails, request a call connection to a second-ranking telephone number. Thus, immediate delivery of information and successful communication may be guaranteed.

Even further, the content registration unit 22 may receive registration of a contact address available for immediate communication at the present time based on the communication situation of the user among the plurality of registered contact addresses from the application 300 of the first user having registered the content. Then, the application 300 of the second user attempting to contact the first user is first provided with the contact address available for immediate communication registered by the first user to support immediate communication of the user.

Also, the content registration unit 22 may further receive registration of at least one other content related to the content as a relaying content from the application 300 of the first user having registered the content. Of course, the relaying content is content registered by the first user or the second user. If a communication event between users occurs on the relaying content of the user A through the intermediation of the information distribution server 2, the first user having registered the content corresponding to a parent node of the relaying content may be provided with a predetermined reward by the information distribution server 2 and the user A.

In the foregoing, the digit string registered through the theme digit string registration unit 21 and the content registration unit 22 is distributed to the public by the information distribution server 2. The distribution may involve an online medium or an offline medium, and the medium includes, but is not limited to, newspaper, broadcast, and a web page. When the information distribution server 2 distributes the digit string to the user through the medium and the distributed digit string is exposed to the public and is widely propagated, the user exposed to the digit string searches for the digit string by executing the application 300 and receives a search result of the content. Here, content delivery through the medium is limited by the time, resources, and costs. However, the information distribution server 2 only delivers the digit string of the content through the medium, so the constraints can be removed. That is, the digit string of the content is delivered through the medium, and the information distribution server 2 delivers the content based on the transmitted digit string.

The information distribution management unit 23 provides processing of information distribution of the content stored in the content DB 220 based on the theme digit string and the content digit string.

Here, the information distribution management unit 23 may receive a search request by receiving information including the theme digit string or the content digit string and further including at least one of the region and the keyword as an access key from the application 300. Then, the information distribution management unit 23 searches the content DB 220 with the requested access key, and responds to the application 300 using a list of found content as a search result.

For example, in the case of a user searching for information, when the user inputs a theme digit string through the application 300, the user can directly access each content matched to the theme digit string found by the information distribution management unit 23. The user can directly access content related to a particular meaning or subject using the theme digit string. If it is assumed that a query is "delicious restaurants near the city hall offering 50% off today only", the user has inconvenience of having to input a combination of five keywords 'today', '50%', 'only', 'city hall' and 'delicious restaurants', but the present disclosure enables a user to immediately access content matched to the theme digit string (e.g.: 5050) through the theme digit string matched to the query. Here, when the user further inputs the region and the keyword to the theme digit string and conducts a search, the search scope is further limited and the user accesses desired information timely. Then, all over the world, if a user inputs the theme digit string "5050" and requests a search, content matched to the theme "restaurants near the city hall offering 50% off today" will be provided to the application 300 of the user over the nations providing the information distribution service. Also, the user may immediately access any one content identified by the content digit string.

Further, the information distribution management unit 23 may receive, from the application 300, a retrieval request of the content registered for the theme digit string in real time. Then, the information distribution management unit 23 searches the content DB 220 with the theme digit string as an access key and responds to the application 300 using a list of content arranged in the order of registration time as a search result.

Also, when the information distribution management unit 23 receives a retrieval request of the individual content from the application 300 through the list of content, the information distribution management unit 23 may search for content including a content digit string registered for the requested content, and further including at least one of a region, a keyword, a title, a content and a user contact address in the content DB 220 and respond to the application 300. For example, if the content is multimedia data, the application 300 immediately plays the responded content.

The user location management unit 24 may receive, from the application 300 of the first user, registration as to whether to make public a location of the smart terminal 3 having a location identification function in connection with the content during content registration. When the first user permits location publication, the user location management unit 24 receives the location of the smart terminal 3 as periodic data in real time from the application 300 of the first user. Also, the user location management unit 24 provides location information of the first user to the application 300 of the second user from which the content of the first user is retrieved. The application 300 of the second user displays the location information of the first user through a map on the screen. Of course, a business location of the first user may be further displayed on the map by setting of the first user. Further, a route guide service from a current location of the second user and a current location of the first user may be provided on the map.

The connection relay charging unit 25 receives a request for connection by receiving a selection of the contact address from the application 300 having received information of the content, and intermediates communication connection to the contact address. By the intermediation of communication connection, an event such as calling, text sending or URL linking occurs at the application 300. Of course, the application 300 may directly perform the function of the occurred event or execute an application of a corresponding function installed in the smart terminal 3. For example, in the case of calling and text sending, a call application and a text application installed in the smart terminal 3 may be each executed in response to the event occurred at the application 300.

Then, the connection relay charging unit 25 charges the user having requested connection for a connection intermediation cost. The cost charging may be accomplished by deducting from a cost settled beforehand or by charging a cost later. In the case of a telephone number, each time a call connection fails, the telephone number may be automatically replaced with a telephone number corresponding to the call connection ranking in an attempt to make a telephone connection.

When an event occurs in which the second user tried to contact the first user using the application 300 and the event occurred is processed through the intermediation of the information distribution server 2, the connection relay rewarding unit 26 performs reward processing.

Here, before a visit to the first content, the second user may make a visit through a high-level content in which the first content is registered as a relaying content, or may make a visit by clicking the first content in the list retrieved with the theme digit string. The connection relay rewarding unit 26 tracks a history of a route along which the second user visited the first content, and gives a reward to a user having registered content corresponding to a high-level history of the visit history or a user having registered a theme digit string. According to a reward policy, the number of high-level users included in the history may be at least one.

For example, when a contact event of a user occurs on the second content displayed by the application 300 and the user makes a visit through the first content of high level to which the second content is linked as a relaying content, the connection relay rewarding unit 26 may give a reward of a predetermined cost to the user having registered the first content of high level having a link to the second content. Also, when the user makes a visit by clicking a title of the second content in the list of content from which the user retrieved the theme digit string through the application 300, the connection relay rewarding unit 26 may give a reward of a predetermined cost to the user having registered the theme digit string.

On the other hand, mediation of various user communication may occur through the registered content. The mediation of user communication, for example, a variety of user communication services including a search service of the information distribution management unit 23, a connection relay service of the connection relay charging unit 25, and a content-mediated settlement service, are provided to users by the information distribution server 2. In this case, a user A having registered the content for which a service was produced pays a predetermined commission to a user B who generates and manages the theme digit string matched with the content. That is, the user B receives a reward corresponding to the predetermined commission from the user A by the communication occurred from the content of the user A. When settlement takes place through the content of the user A, a settlement agent gives the user A an amount of money left after the deduction of a predetermined amount of money including the commission of the user B and the service fee from the settled amount. Of course, the settlement agent may be the information distribution server 2.

FIG. 3 is a schematic diagram showing an example of a theme digit string managed by the information distribution server 2 of FIG. 1.

There is no particular limitation on the digit string format and content of description information of the theme digit string. Unless the subject of information is contrary to social morality, description information mapped to a key of the theme digit string representing the subject of respective information may be registered in the digit string DB 210 of the information distribution server 2. Each description information has a unique content, and the description information and the theme digit string match one-to-one. For the user to make a request for retrieval by inputting one theme digit string indicates immediately accessing a plurality of content collected with the unique content.

In the case of 114 information call as illustrated, after a theme digit string is registered as "114" in the digit string DB 210, information of each telephone number as a child node of the theme digit string may be registered as each content in the content DB 220.

For a theme digit string "64", when information associated with an individual candidate related to a local election and information of a voter is registered, content information of an online community with regard to the election may be registered in the content DB 220.

Also, for a theme digit string "5050", information about various types of products related to 50% off, seller information, and buyer information may be registered as each content in the content DB 220.

Additionally, event information associated with various types of festivals, events and meetings may be registered as a theme digit string, and is not limited to any particular content and type of information. For example, in the case where a theme digit string of fireworks festival is registered, with the theme digit string as a parent node, any content may be registered without limitation provided it is relevant to description information including event schedule, transportation route information and nearby restaurants. Of course, the content may have a content digit string as a unique identification key.

Also, even ordinary users apply for a representative digit string for free or at a cost according to their interests and register a theme digit string on the information distribution server 2. Of course, the user having registered the theme digit string may or may not permit other user's content registration. For example, the user may apply for a representative digit string to run a transaction market such as a shopping mall, and register a product content matched to the representative digit string of the shopping mall. Also, registration of the product content may be preset on the condition as to whether other user's registration is possible or not.

FIGS. 4 through 7 are schematic diagrams showing examples of content search screenshots displayed by the application 300. Hereinafter, for convenience of description, it is assumed that the user conducts a search using the theme digit string "64" of FIG. 3 and has a unique UI.

Figure 4:
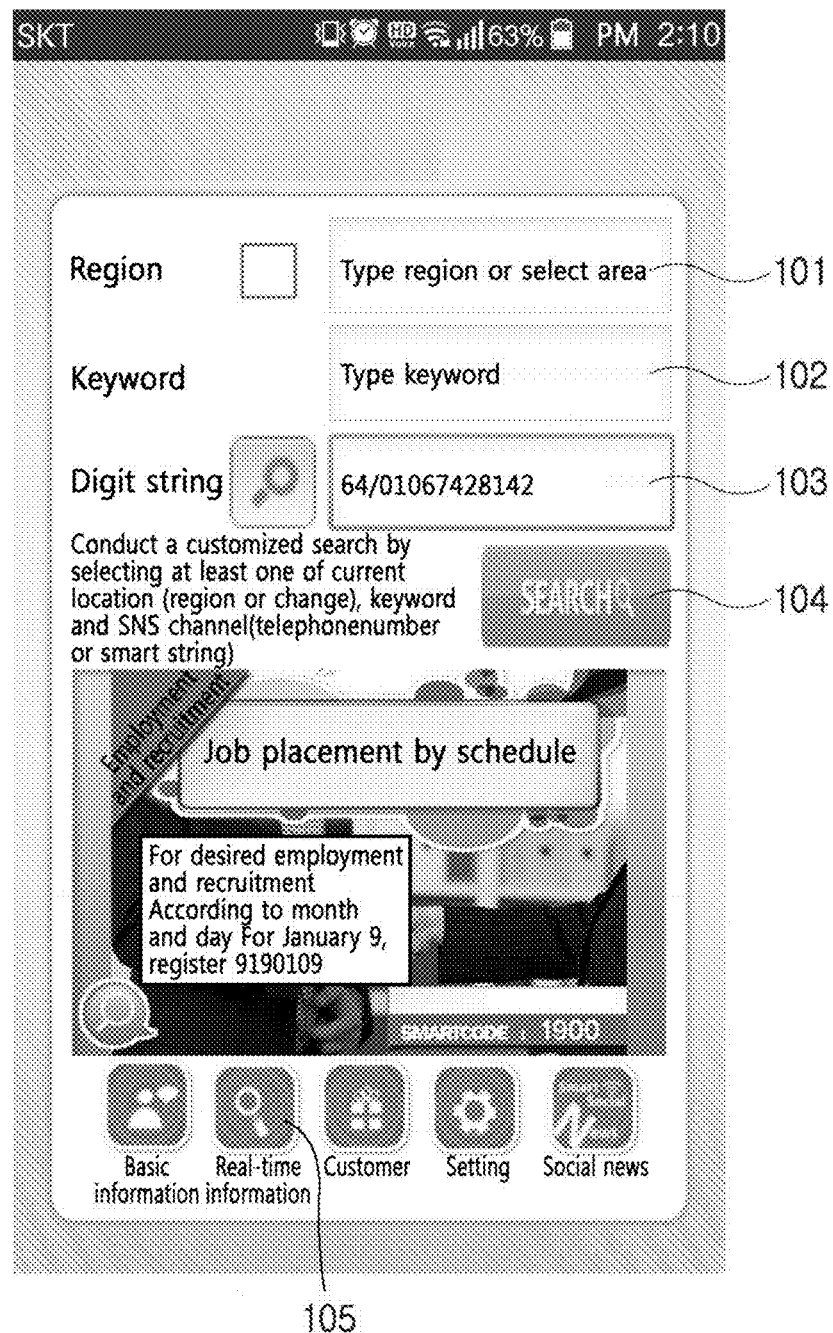
FIGS. 4 through 7 are schematic diagrams showing examples of content search screenshots displayed by an application of FIG. 1.

Referring to FIG. 4, the second user may input search information as an access key in each input window of a region 101, a keyword 102 and a theme/content digit string 103 on the display of the application 300. In the case of the input window region 101, the second user may set a search scope by selecting a current location of the smart terminal 3 or a particular region. For the keyword 102, input information of the second user is inputted for a keyword of content of the first user having registered the content. For the theme/content digit string 103, a theme digit string or content digit string exposed to the second user is inputted as a service special code. Also, the second user may input a digit string found through the search display of the digit string in the theme/content digit string 103. On the other hand, real-time information 105 is selected when the second user makes a request for retrieval of content registered so far in the order of registration time without using a search.

As the second user knows the group code "64" of FIG. 3 and a content code "01067428142" corresponding to a mobile phone number as a service special code, the second user may input "64/01067428142" and press a search button 104.

For reference, the screen of FIG. 4 may include only the digit string input window 103 instead of the input windows 101~103. The second user can input a digit string in the digit string input window, and the information distribution server 2 can retrieve content matched to the digit string inputted in the digit string input window 103 from the content DB 220. If the content is a multimedia content, the application 300 receives and plays the content. If the content is content having a unique UI, the application 300 displays the content through the UI.

Figure 5:
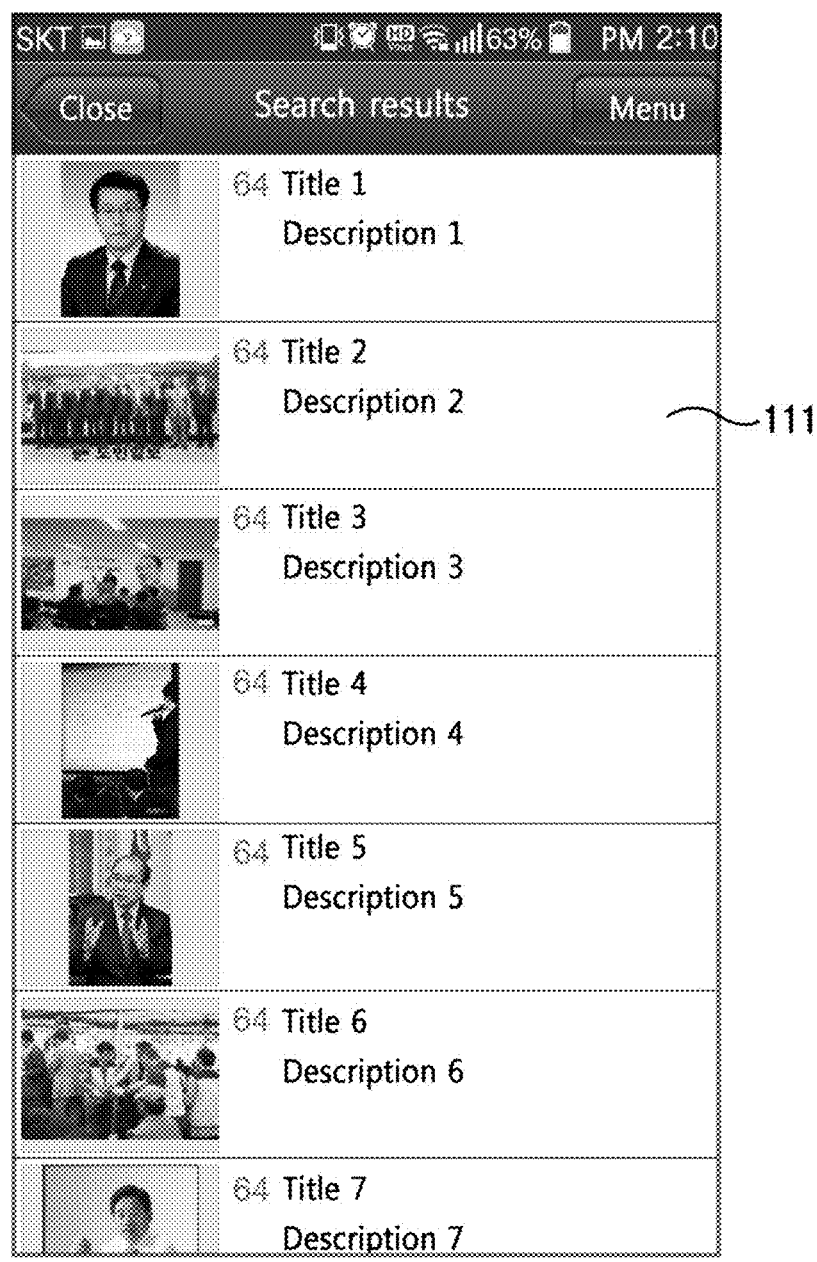

Referring to FIG. 5, the application 300 receives a list of content found using the theme digit string "64" as a search key from the information distribution server 2 and displays the same on the screen. For the exposure and propagation of the theme digit string, each content included in the list of content is displayed with the theme digit string "64". In the list of content provided as a search result, the theme digit string "64" is exposed to the user continuously repeatedly. When the second user retrieves some of description such as a title and a content of the content while scrolling the screen of the list up and down, description information of the theme digit string "64" will be intuitively understood. When the second user clicks a particular content 111, the application 300 requests a detailed retrieval of the clicked content to the information distribution server 2.

Figure 6:
Figure 6:
Figure 7:

Referring to FIGS. 6 and 7, the application 300 receives the content 111 clicked in FIG. 5 by the second user from the information distribution server 2 and displays the same on the screen. The second user sees information while scrolling the content screen up and down. When View Location 121 is selected, location information or business information of the first user having registered the corresponding content, and the title (essence) of the content registered in real time are displayed on the map. When a video icon 122 is selected, a video related to the content is played. Playing the video may be carried out by execution of a dedicated player or through a link to an address of the video. The second user may try to contact the first user by selecting a mobile phone 124 or a phone page 125 as the contact address. When the second user selects the phone page 125, the second user visits a web page of the first user through a link to a URL of the first user. The second user may register a comment on the content by selecting Add Review 126. Also, a relaying content 127 set by the first user is listed on the content. Of course, each content in the list of relaying content 127 is displayed with the digit string, and the displayed digit string is always exposed to the user. When the second user selects the relaying content 127 and attempts to access the relaying content 127, the second user having retrieved the relaying content may be charged, and a portion of the charge imposed on the second user may be provided as a reward to the first user.

Particularly, when a content digit string of the content 111 is the telephone number of the first user, and the telephone number of the first user is the same as the telephone number of the mobile phone 124 and a URL of the phone page 125 of the content 111, the convenience of the information distribution server 2 accessing information is maximized. To maximize the access convenience of the second user who accesses information, it is preferred that the first user registers his/her telephone number as a content digit string and a contact channel address. Then, the second user is provided with an opportunity of various access channels such as retrieval of the content 111, calling to the mobile phone 124 and a visit to the phone page 125, using the telephone number of the first user.

FIGS. 8 through 13 are schematic diagrams showing examples of content registration screenshots displayed by the application 300 of FIG. 1. For reference, FIGS. 8 through 13 show the UI displayed while the first user registering content scrolls down.

Figure 8:
FIGS. 8 through 13 are schematic diagrams showing examples of content registration screenshots displayed by an application of FIG. 1.

Referring to FIG. 8, the keyword 102 of FIG. 8 is information registered by the first user as an access key of the content, and corresponds to the keyword 102 of FIG. 4. The theme digit string 103 is a high-level parent node to which the content belongs, and is information inputted or selected by the user. The content digit string 131 is information of a service special code and an access key of the content. The theme digit group 103 and content digit string 131 of FIG. 8 correspond to the theme/content digit string 103 of FIG. 4.

In the embodiment of the present disclosure, the theme digit string is information of a channel, an address and a key for access and classification of the content, and necessarily requires the first user to register. On the contrary, for the content digit string, the keyword and the region, registration by the first user and display on the screen may be omitted.

Figure 9:
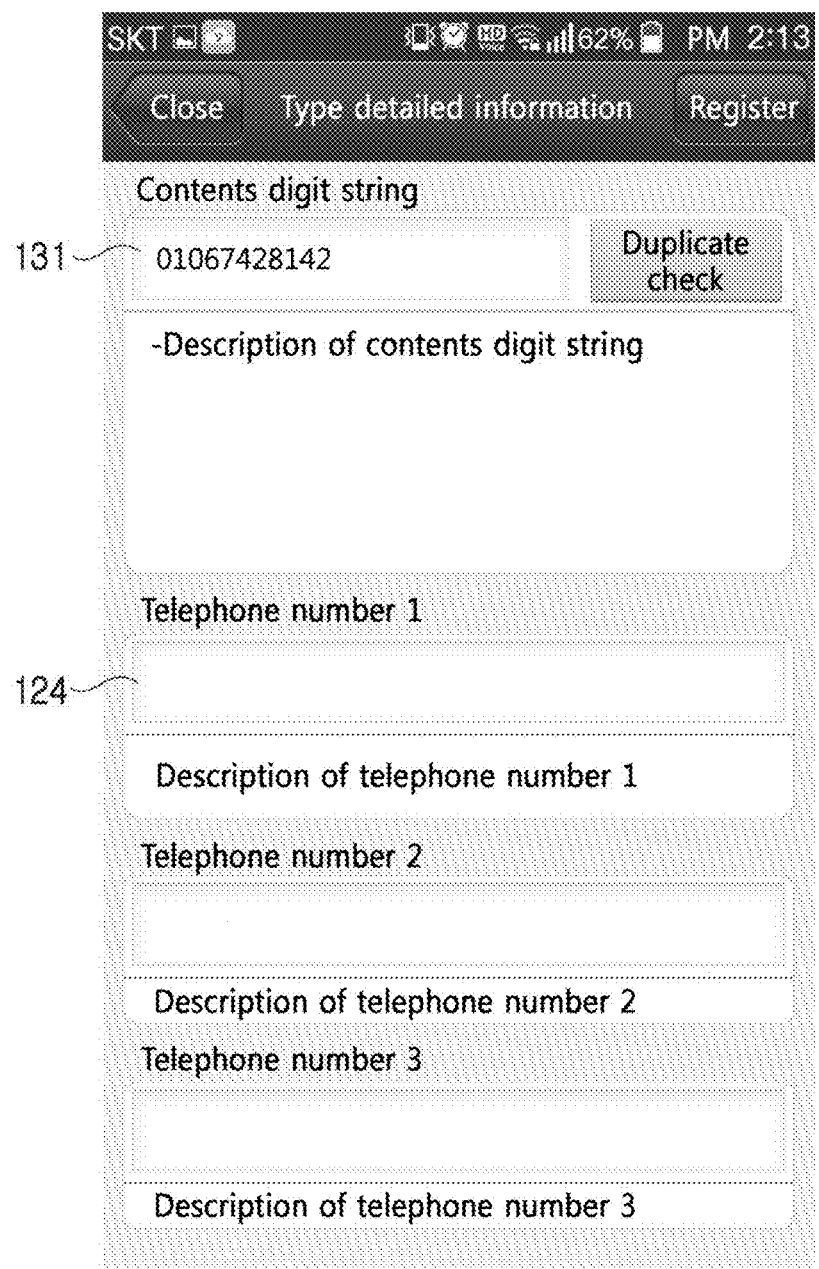

Referring to FIG. 9, a telephone number 124 is a telephone number by which the first user can make contact through the content. The first user may register a plurality of telephone numbers. Here, in the event of failure of a high ranking call connection to the first user based on the call ranking setting, an attempt to make a call connection to the first user is made using a lower ranked telephone number. The telephone number 124 of FIG. 9 corresponds to the telephone number 124 of FIG. 7.

Figure 10:
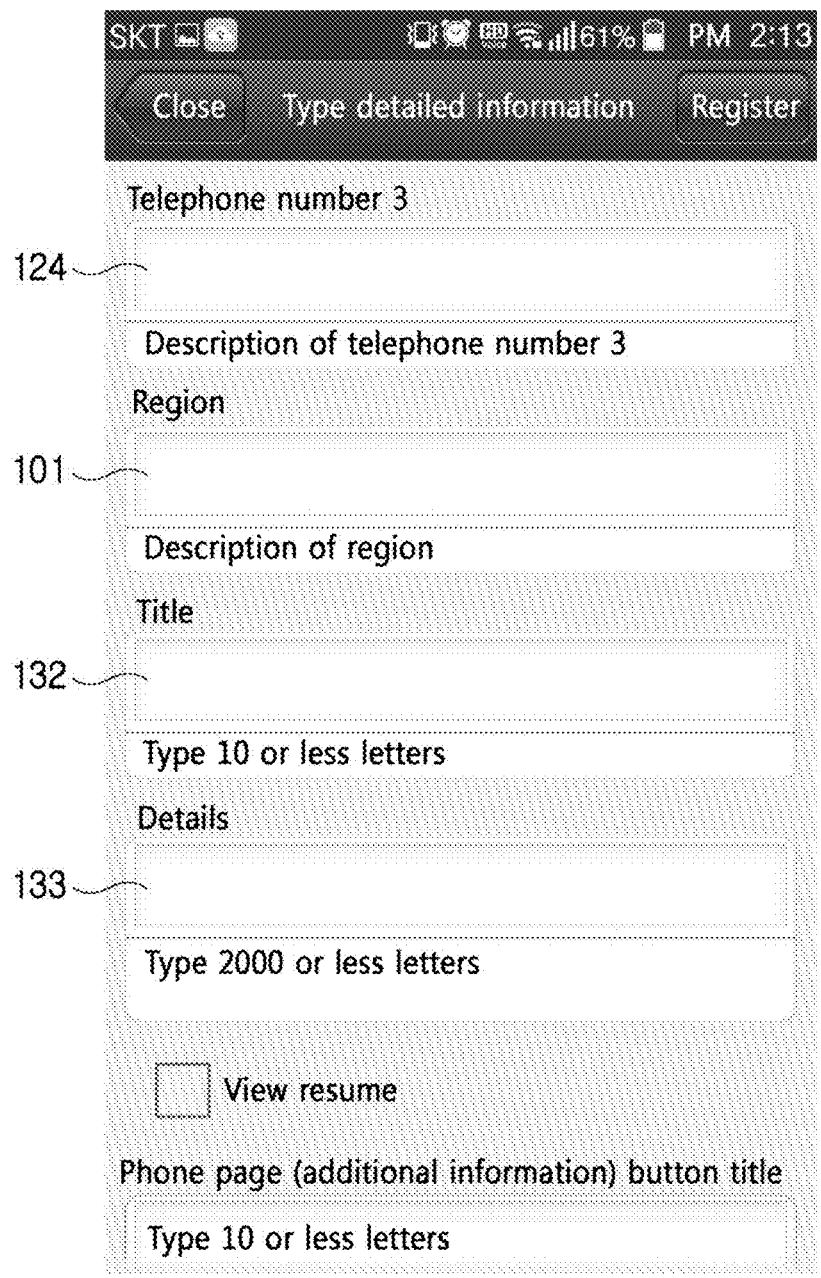

Referring to FIG. 10, the region 101 of FIG. 10 is information selectively inputted by the first user in connection with the content and may correspond to the region 101 of FIG. 4. A title 132 and details 133 is information registered in regards to the content and corresponds to the content 111 displayed on the list of FIG. 5.

Figure 11:
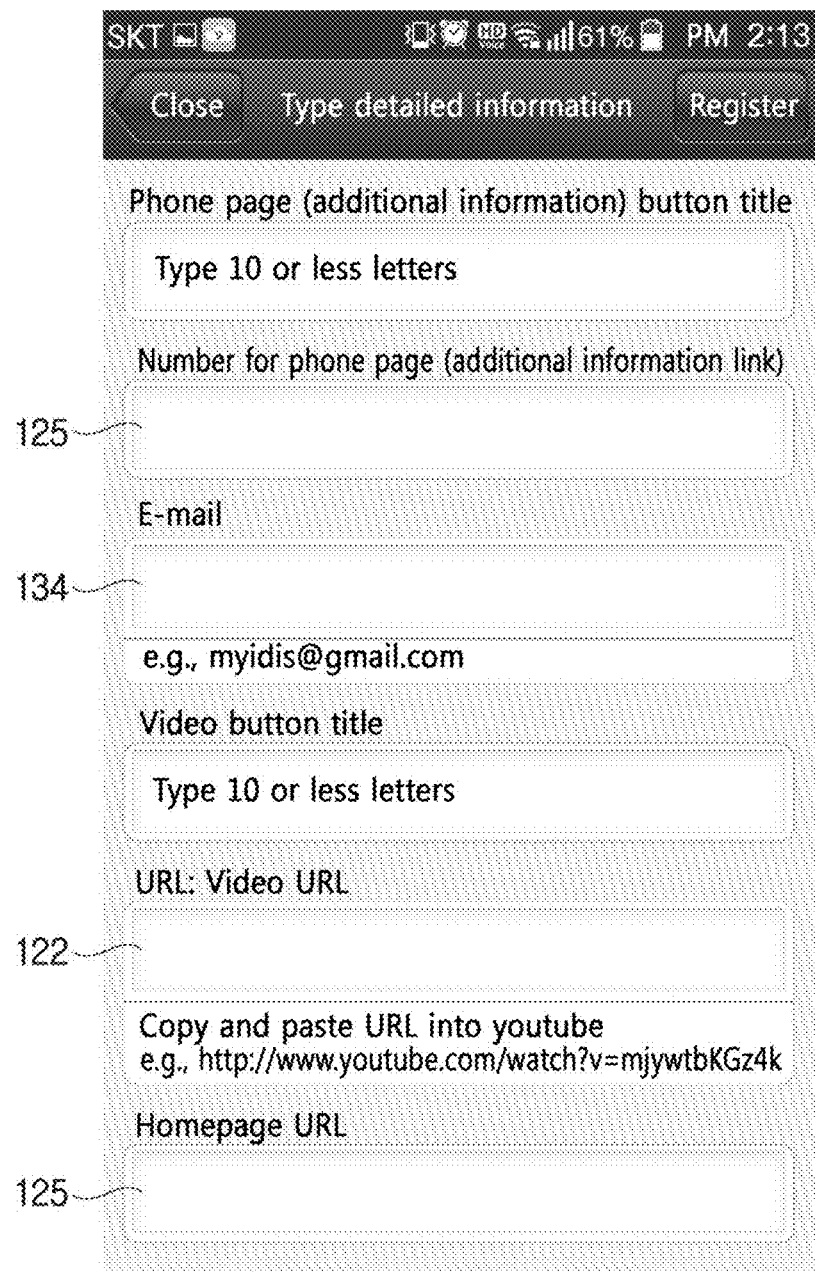

Referring to FIG. 11, the phone page 125 and the URL 125 of FIG. 11 is an Internet URL having a link to the content and corresponds to the phone page 125 of FIG. 7. The e-mail 134 of FIG. 11 corresponds to the e-mail (not shown) displayed in FIG. 7. The video URL 122 of FIG. 11 is a video related to the content and corresponds to the video 122 of FIG. 7.

Figure 12:
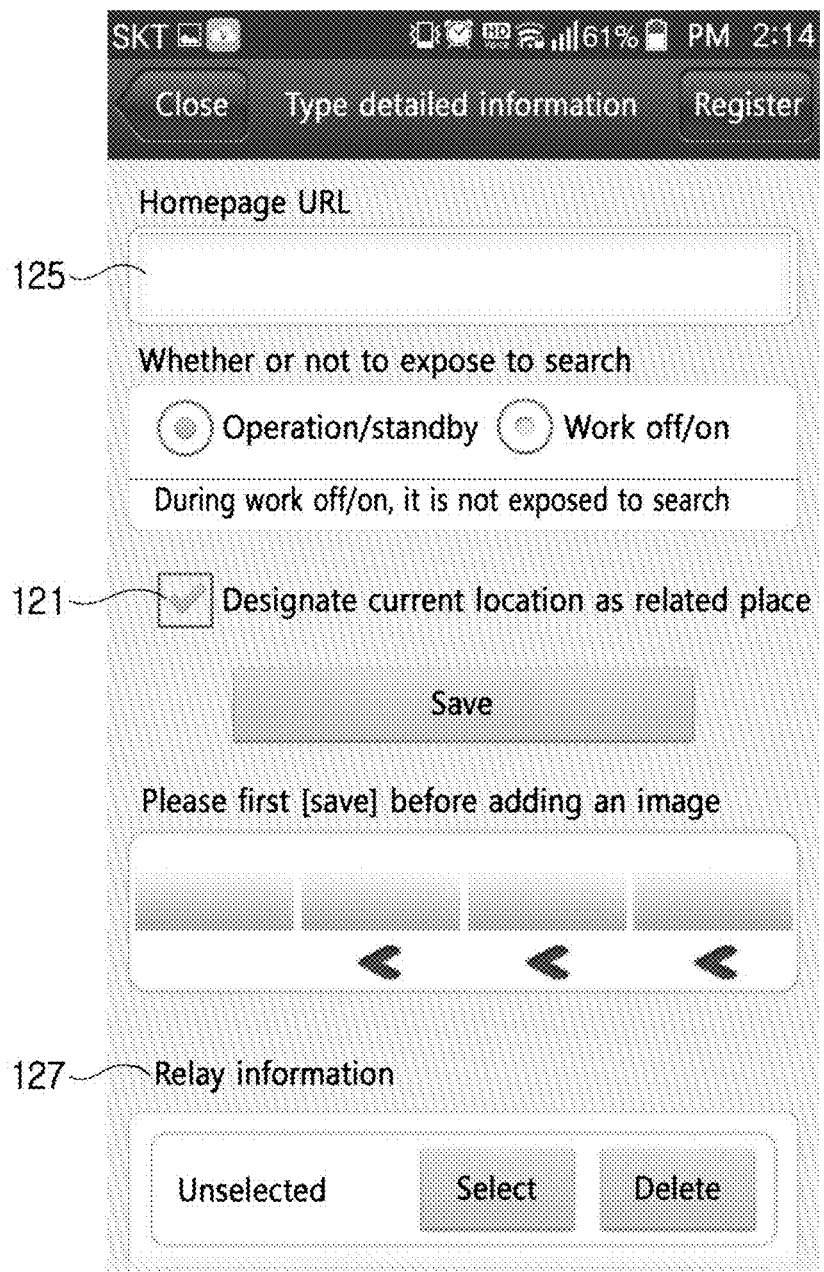

Referring to FIG. 12, a current location 121 of FIG. 12 is information for consent when collecting location information of a mobile terminal of the first user and corresponds to the view location 121 of FIG. 7.

Figure 13:
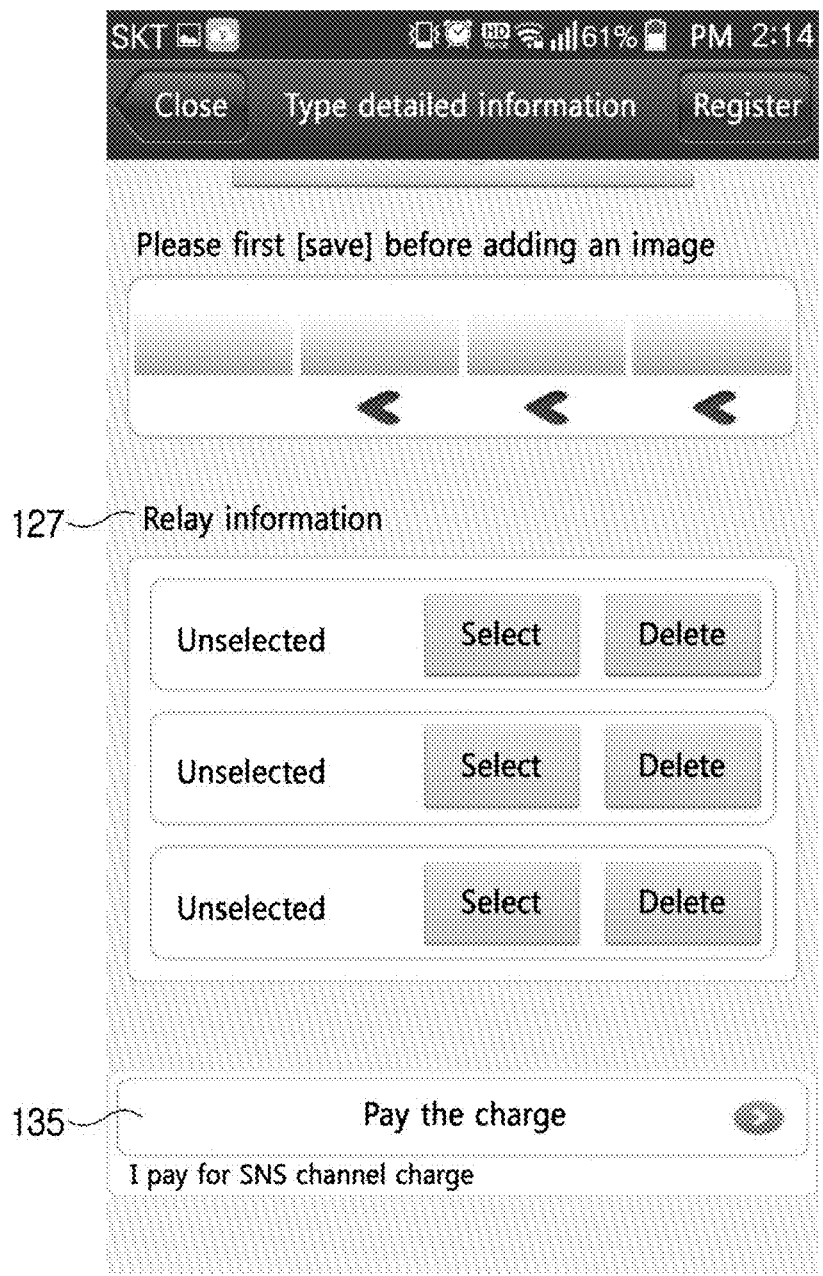

Referring to FIG. 13, relay information 127 of FIG. 13 is content information associated with the corresponding content and corresponds to the relaying content 127 of FIG. 7. Settlement 135 of FIG. 13 is for settlement processing of charges for an intermediation service offered by the information distribution server 2 to the contact address of the first user.

Figure 14:
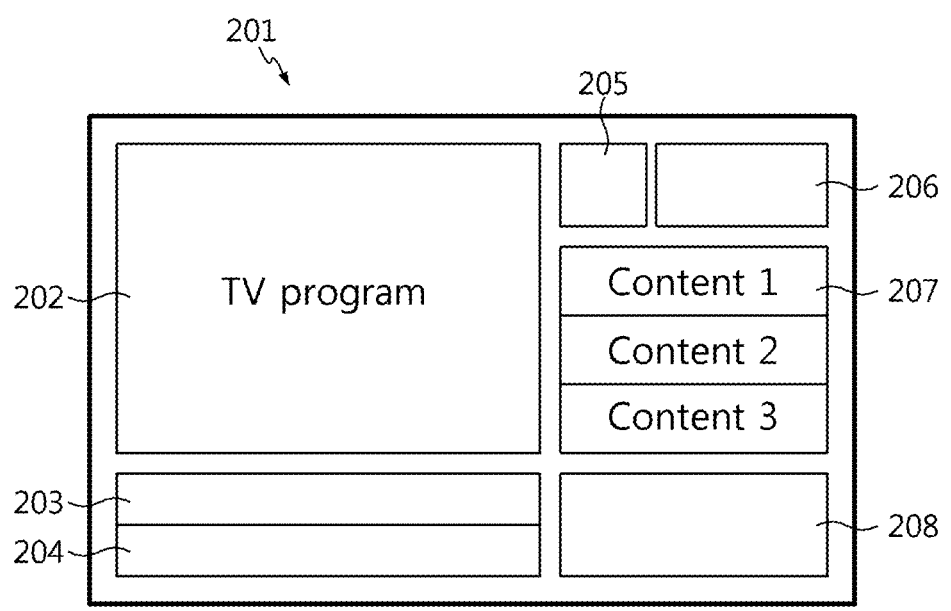
FIG. 14 is a diagram showing an example of an IP TV screen according to another embodiment of the present disclosure.

FIG. 14 is a diagram showing an example of the screen of a TV terminal 201 according to another embodiment of the present disclosure. For reference, there may be a UI with various displays for providing information associated with content matched to a digit string to the TV terminal 201, and the screen configuration of the TV terminal 201 is not limited to the UI shown in FIG. 14.

The information distribution system 1 according to another embodiment of the present disclosure includes the smart terminal 3 corresponding to the TV terminal 201. The TV terminal 201 is a terminal capable of receiving and outputting TV broadcast such as an IP TV and a smart TV. A smart phone and a smart pad correspond to the TV terminal 201 because they may have a TV function by the application 300. When the TV terminal 201 is powered on, the application 300 runs and outputs the TV broadcast received in real time to the screen.

Preferably, the screen outputted through the execution of the application 300 on the TV terminal 201 includes a TV area 202 where a program of TV broadcast is outputted in real time, a digit string area 203 where information of a digit string is outputted, an advertising digit string area 204 where a digit string of an event and an advertisement is outputted, a region window 205 where an input of a region of content is received, a digit string window 206 where a digit string of content is inputted, a content area 207 where information of content is outputted, and a digit string advertising area 208 where video advertising information of a digit string is outputted.

In the TV area 202, the application 300 of the TV terminal 201 outputs information of TV broadcast in real time.

In the digit string area 203, the application 300 displays at least one digit string. The digit string displayed on the digit string area 203 corresponds to at least one digit string pre-designated by the user and a digit string related to the program of TV broadcast. For example, when a theme digit string such as the user's favorite restaurant and baseball is pre-registered in the application 300, the application 300 displays the digit string registered by the user on the digit string area 203. Also, the digit string related to the broadcast station, program information, and the content outputted to the TV area 202 may be displayed on the digit string area 203 in real time.

In the advertising digit string area 204, the application 300 displays at least one digit string requested for an event and an advertisement. Providers having the theme digit string may request an advertisement of the theme digit string to the information distribution server 2. The theme digit string requested for advertising is received by the application 300 in real time and is displayed on the advertising digit string area 204. On the other hand, a keyword corresponding to the theme digit string may be further displayed on the advertising digit string area 204.

Here, the digit strings displayed on the digit string area 203 and the advertising digit string area 204 may be displayed by a scroll or rolling method. Also, a keyword corresponding to the theme digit string may be further displayed on the digit string area 203 and the advertising digit string area 204. When any one theme digit string or keyword is selected on the digit string area 203 or the advertising digit string area 204, the application 300 transmits a request for provision of content corresponding to the selected information to the information distribution server 2.

In the region window 205, the application 300 receives a selection of a favorite region from the user, and requests the information distribution server 2 to conduct a content search with the theme digit string and the region as an access key. The user may limit the search scope of the content to a selected region by selecting the region. A default region value of the region window 205 is designated as the whole region.

In the digit string window 206, the application 300 provides the user with a digit string management service including digit string registration, correction, deletion and search. The user may search for a desired digit string by inputting a digit string and a keyword in the digit string window 206. The application 300 requests a digit string search by transmitting the digit string and the keyword inputted in the digit string window 206 to the information distribution server 2, and receives digit string information of a search result from the information distribution server 2 and outputs the same on the screen. Also, the application 300 requests a content search by transmitting the digit string inputted in the digit string window 206 to the information distribution server 2.

In the content area 207, the application 300 requests a list of content matched to the digit string by transmitting the information requested by the user in the digit string area 203, the advertising digit string area 204, the region window 205 and the digit string window 206 to the information distribution server 2, and receives the list of content from the information distribution server 2 and displays the received list on the content area 207 by a scroll method. If the number of content in the list of content is one, playing of the content may be performed at the same time as displaying of the list.

When the user requests content provision in the digit string area 203, the advertising digit string area 204 or the digit string window 206 of the application 300 using a digit string or keyword, a list of content matched to the selected digit string or keyword is received from the information distribution server 2 and the received list of content is displayed on the content area 207.

Also, when a particular content is selected on the content area 207, the application 300 requests the information distribution server 2 to provide the selected content, and the content received from the information distribution server 2 is played on a corresponding content area. Of course, the content to be played may be outputted in full screen of the TV terminal 201. The content outputted in full screen may have various UIs and layouts, and may have the UI of FIGS. 6 and 7.

For example, a businessman A takes a picture of his/her product information with a smart phone, and uploads image or video information to the information distribution server 2 using the application 300 of the smart phone together with a theme digit string. Subsequently, a TV viewer selects the theme digit string in which the content of the businessman A is registered on the digit string area 203, and selects the content of the businessman A on the content area 207 while he/she is watching the TV terminal 201. Then, the TV viewer watches the content of the businessman A received and played by the application 300 through the screen.

As another example, a user B requests the generation of a secret digit string for the exclusive use of the user B using the digit string window 206 while he/she is watching TV, and receives the secret digit string. The user B records a video with a smart phone, and uploads the secret digit string and the video to the information distribution server 2. The user B notifies the secret digit string to a friend. Subsequently, the friend inputs the secret digit string in the digit string window 206 of the TV terminal 201, and when the friend requests the play of the video of the user B in a list displayed on the content area 207, the video of the user B received from the information distribution server 2 is outputted through the screen. Of course, the user B may set a play password when uploading the video to authorize only the friend to play the video.

In the advertising area 208, the application 300 outputs an advertisement of the theme digit string or content registered as a video. When the user selects an advertisement on the advertising area 208, the selected advertisement may be outputted in full screen of TV. Also, by executing the advertisement, the application 300 may receive and display a list of theme digit strings, or receive and display the content.

<2. Method Configuration>

An information distribution method according to an embodiment of the present disclosure may be preferably embodied through construction of the above-mentioned information distribution system 1.

Figure 15:
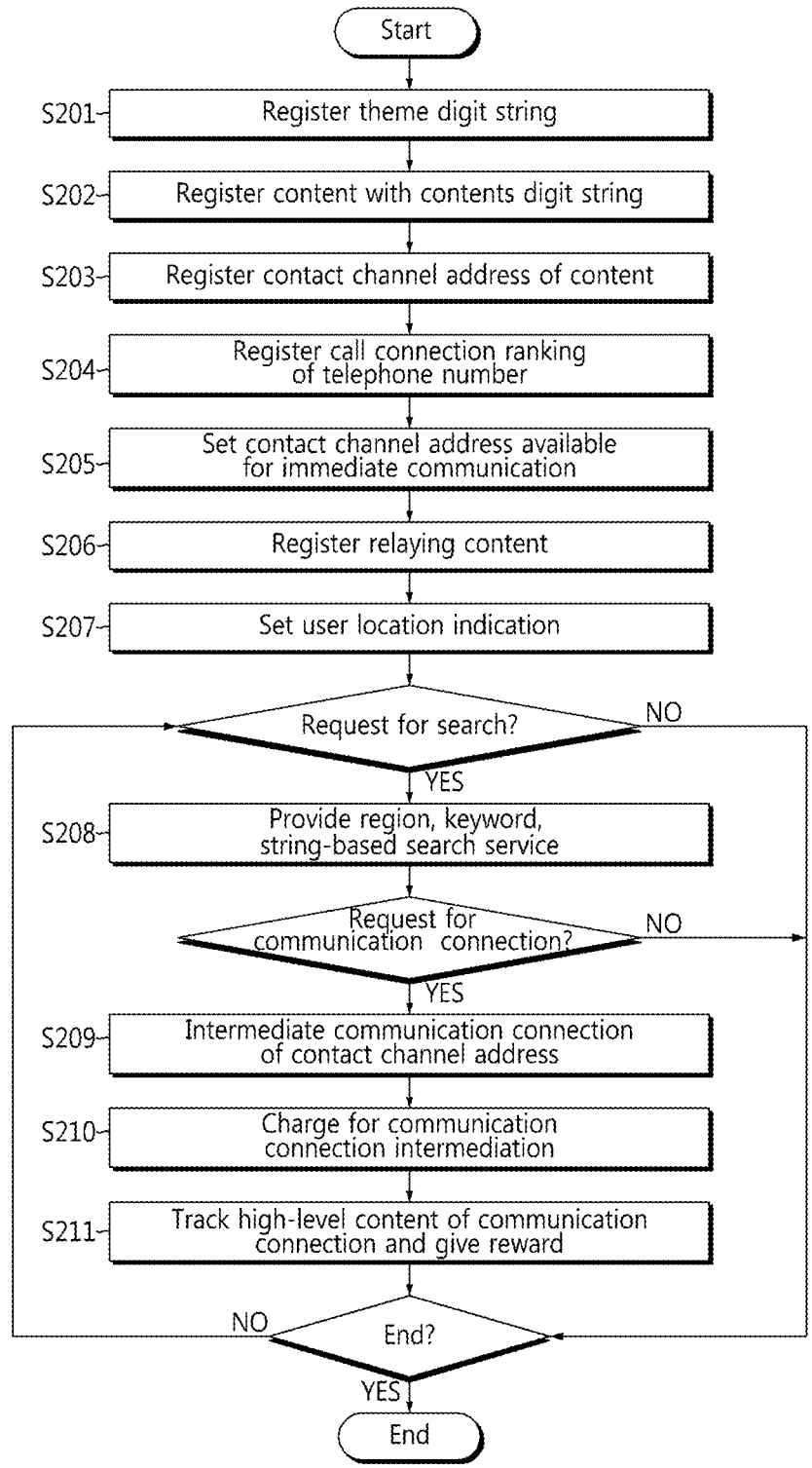
FIG. 15 is a schematic flowchart of an information distribution method according to an embodiment of the present disclosure.

FIG. 15 is a schematic flowchart of an information distribution method according to an embodiment of the present disclosure.

The information distribution server 2 receives registration of a theme digit string corresponding to a service special code by the request of an administrator or a user and stores the same in the digit string DB 210 (S201). The theme digit string is a type of information of a channel or key for information classification and access, and is not limited to a particular theme content. For example, the theme digit string is used as access information matched to one sentence, subject or description. By the registered theme digit string, the information distribution server 2 receives registration of various types of content matched to the registered theme digit string.

The information distribution server 2 receives an input of a content digit string from the application 300, and receives registration of content information uniquely identified by the content digit string and stores the same in the content DB 220 (S202). Of course, in the case where the content digit string is omitted, the theme digit string and the content information may match and be registered in the content DB 220. The content digit string corresponds to a service special code of an individual content. That is, an individual content may be retrieved by the content digit string. When it is assumed that the content digit string is a telephone number of a user, the telephone number of the user may be used as a service special code (key), a telephone number, an Internet URL, and etc.

Here, the information distribution server 2 receives registration of a contact address of the content (S203). The contact address corresponds to a telephone number, an e-mail address, an Internet address and a social network service (SNS) address of the user.

Further, the information distribution server 2 may receive registration of a plurality of telephone numbers, and receive registration of a call connection ranking for each telephone number (S204). When the call connection ranking is registered, if a call connection to a high ranked telephone number fails, an attempt to make an automatic connection is made using a next ranked telephone number. Thus, it is apparent that timeliness and success of information communication may be guaranteed.

Even further, the information distribution server 2 may receive registration of a contact address available for immediate communication by the user's setting of the content (S205). When the user is in a meeting or having a meal, a contact address the user prefers may be preset. So, other user who attempts to contact the user selects the contact address the user prefers, and contacts the user. Thus, it is apparent that not only timeliness of information communication but also convenience may be ensured.

Preferably, the information distribution server 2 may receive registration of content relevant to the content as a relaying content (S206). By the registration of the relaying content, an opportunity to deliver information may be further expanded. Also, if content A has popularity and reliability, a relaying content of content A receives an opportunity of having accompanying equivalent popularity and reliability.

Subsequently, the information distribution server 2 receives setting as to whether to make public location indication of a mobile phone of user A having registered the content (S207). If a current location of the user A is made known to all other users retrieving the content, the user A may give intimacy and reliability to other users. In the case where a representative digit string is shared between close friends or acquaintances and the content is registered, location information publication of the user A is a useful service. Thereby, a registration procedure of the content is processed through S202 to S207.

Subsequently, when a search request of information takes place by the application 300, the information distribution server 2 provides a digit string-based search and retrieval service to the application 300 (S208). The user may request a search for a theme digit string through the application 300, request the retrieval of at least one content matched to the found theme digit string, and receive the retrieved content. If the user further selects a region or a keyword for the theme digit string and requests a search, the search scope may be limited to a location of the region or content matched to the keyword. That is, the user can request the retrieval of a theme digit string and immediately access information matched to the subject and description of the digit string. The information distribution server 2 provides a list of found content to the application 300 through a search service. Also, when the user selects a particular content from the list of the application 300 and requests the retrieval, the information distribution server 2 provides a retrieval/play service of the selected content to the application 300. Of course, the user can request a search for a content digit string and be provided with individual content matched thereto.

After the content is displayed in the application 300, when the user selects a particular contact address and requests a connection, the information distribution server 2 intermediates a communication connection between users according to a corresponding communication method (S209). The intermediation service provided by the information distribution server 2 includes call intermediation, text intermediation, e-mail intermediation, URL link intermediation, and the like.

Subsequently, the information distribution server 2 charges the user having registered the corresponding content for the provided intermediation service (S210).

Also, the information distribution server 2 gives a reward for profits obtained through cost charging to a user having registered a high-level content which induced the creation of the intermediation service or a user having registered a representative theme digit string (S211).

In the foregoing exemplary embodiments, the term "~unit" is not used to represent hardware components of the lost password processing system 1. Thus, a plurality of components may be integrated into one component, and one component may be divided into a plurality of components. Also, the components may represent hardware components, but may also represent software components. Accordingly, it should be understood that the present disclosure is not specially limited by the term "~unit".

While the present disclosure has been hereinabove described by a limited number of embodiments and drawings, the present disclosure is not limited thereto and it should be understood that various changes and modifications may be made by those having ordinary skill in the art within the scope of the disclosure and the appended claims and their equivalents.

| Description of reference numeral(s) | |
| --- | --- |
| 1: information distribution system | 2: information distribution server |
| 3: smart terminal | 300: application |

What is claimed is:

1. An information distribution system which provides smart terminals with an information distribution service of content using a digit string, representing a single meaning for an identifiability of content, exposed through a medium as access information of the content, the information distribution system comprising:
   an information distribution server comprising:
   at least one processor;
   memory; and
   at least one program stored in the memory and executable by the at least one processor, the program comprising:
   a theme digit string registration unit which registers a theme digit string that identifies each content theme by registration request;
   a content registration unit which registers a content and a content digit string that identifies the content and matches the content digit string to the theme digit string; and
   an information distribution management unit which after the information distribution server distributes the registered theme digit string and content digit string to be exposed to users through the medium, receives a search request of the content including the exposed theme digit string and content digit string from the smart terminal, searches for content using the received theme digit string and content digit string as an access key from a DB, and transmits the searched content to the smart terminal, to manage provision of the information distribution service.

2. The information distribution system according to claim 1, wherein the theme digit string registration unit further receives registration of description information describing a theme for the theme digit string, matches registered description information to the theme digit string, and stores the same in a digit string DB.

3. The information distribution system according to claim 1, wherein the content registration unit receives a registration request of content information including the content digit string and further including at least one of a region, a keyword, a title, content, and a user contact address of content, and matches the received content information to the theme digit string and stores the same in a content DB.

4. The information distribution system according to claim 1, wherein the information distribution management unit processes at least one of the following functions of:
   receiving a search request by receiving the theme digit string from the smart terminal, searching for at least one content matched to the requested theme digit string from the content DB, and providing a list of searched content as a search result;
   receiving a search request by receiving the content digit string, searching for the content identified by the requested content digit string from the content DB and providing a search result; and
   receiving a search request including the theme digit string and further including at least one of a keyword and a region, searching for at least one content matched to information requested for search from the content DB, and providing a list of searched content as a search result.

5. The information distribution system according to claim 1, wherein the information distribution management unit receives a retrieval request of the content registered in real time from the smart terminal, retrieves the corresponding content from the content DB, and provides a list of the retrieved content as a search result.

6. The information distribution system according to claim 1, wherein when the information distribution management unit receives a retrieval request of individual content from the smart terminal, the information distribution management unit retrieves content information including a content digit string registered for the content, and further including at least one of a region, a keyword, a title, content, and a contact address of user from the content DB and provides the same.

7. The information distribution system according to claim 1, further comprising:
a connection relay charging unit which receives a connection request by receiving selection of a contact address of the content from the smart terminal having retrieved the information of the content, intermediates communication connection to the contact address, and charges for a cost of the connection intermediation.

8. The information distribution system according to claim 1, wherein the content registration unit further receives registration of other content that is inserted in display information of the content to display link information and linked by selection of link information, for the content, as a relaying content.

9. The information distribution system according to claim 1, further comprising:
a smart terminal comprising:
at least one processor;
memory; and
at least one application stored in the memory and executable by the at least one processor, the application having a display configuration of:
a digit string window for providing digit string search and digit string input of user;
a region window for receiving selection of a region of content; and
a keyword window for receiving input of a keyword of content,
wherein the application transmits a search request of content including a digit string inputted in the digit string window to the information distribution server using the display configuration, receives a search result from the information distribution server; and displays the search result.

10. The information distribution system according to claim 3, wherein the content registration unit receives registration of at least one of a telephone number, an e-mail address, an Internet address and a SNS (Social Network Service) address as the contact address, and stores the same in the content DB.

11. The information distribution system according to claim 10, wherein the content registration unit receives registration of a plurality of telephone numbers of user, receives registration of call connection ranking for each telephone number, and when a call connection to a first-ranking telephone number fails, makes an automatic call connection to a second-ranking telephone number.

12. The information distribution system according to claim 8, further comprising:
a connection relay rewarding unit which rewards of a predetermined cost to a high-level content user having registered the relaying content, when the content intermediated communication connection to a contact address by a connection request of the smart terminal is the relaying content linked by selection of the link information.

13. An information distribution system which provides smart terminals having a TV function with an information distribution service of content using a digit string, representing a single meaning for an identifiability of content, exposed through a TV as access information of the content, the information distribution system comprising:
an information distribution server comprising:
at least one processor;
memory; and
at least one program stored in the memory and executable by the at least one processor, the program comprising:
a theme digit string registration unit which registers a theme digit string that identifies each content theme;
a content registration unit which registers a content and a content digit string that identifies the content and matches the content digit string to the theme digit string; and
an information distribution management unit which after the information distribution server distributes the registered theme digit string and content digit string to be exposed to users through the TV, receives a search request of the content including the exposed theme digit string and content digit string from the smart terminal, searches for content using the received theme digit string and content digit string as an access key from a DB, and transmits the searched content to the smart terminal, to manage provision of the information distribution service.

14. The information distribution system according to claim 13, further comprising:
a smart terminal comprising:
at least one processor;
memory; and
at least one application stored in the memory and executable by the at least one processor, the application having a display configuration of:
a TV area where a program of TV broadcast is outputted in real time;
a digit string area where content designated by user and a digit string of content related to the program is outputted;
an advertising digit string area where a digit string of an advertising content is outputted;
a region window where selection of a region of content is received;
a keyword window where input of a keyword of content is received;
a content area where a list of content matched to a combination of a digit string selected in the digit string area or the advertising digit string area, a region selected in the region window and a keyword selected in the keyword window is received from the information distribution server and outputted, and when any one content is selected from the outputted list, provision of the selected content is requested to the information distribution server; and a digit string advertising area where video advertising information of a digit string received from the information distribution server is outputted, and playing of a video advertisement is requested to the information distribution server by selection of user, wherein the application provides the information distribution service using the display configuration, receives content selected in the content area or the digit string advertising area from the information distribution server and displays the content.

15. An information distribution method in which an information distribution server provides smart terminals with an information distribution service of content using a digit string, representing a single meaning for an identifiability of content, exposed through a medium as access information of the content, the information distribution method comprising:

registering a theme digit string that identifies each content theme;

registering a content and a content digit string that identifies the content and matches the content digit string to the theme digit string;

distributing the registered theme digit string and content digit string to be exposed to users through the medium;

receiving a search request of the content including the exposed theme digit string and content digit string from the smart terminal;

receiving content matched to the received theme digit string and content digit string as a key from a DB; and transmitting the retrieve content to the smart terminal.

16. The information distribution method according to claim 15, wherein the registering a theme digit string comprises further receiving registration of description information describing a theme for the theme digit string, matching registered description information to the theme digit string, and storing the same in the DB.

17. The information distribution method according to claim 15, wherein the registering a content comprises receiving a registration request of content information including the content digit string and further including at least one of a region, a keyword, a title, content, and a user contact address of content, and storing received content information matched to the theme digit string in a DB.

18. The information distribution method according to claim 15, wherein the managing comprises at last one of the steps of:

receiving a search request by receiving the theme digit string from the smart terminal, searching for at least one content matched to the requested theme digit string, and providing a list of the searched content as a search result;

receiving a search request by receiving the content digit string, searching for the content identified by the requested content digit string, and providing a search result; and receiving a search request including the theme digit string and further including at least one of a keyword and a region, searching for at least one content matched to information requested for search, and providing a list of searched content as a search result.

19. The information distribution method according to claim 15, wherein the managing comprises receiving a retrieval request of the content registered in real time from the smart terminal, retrieving the corresponding content, and providing a list of retrieved content as a search result.

20. The information distribution method according to claim 15, wherein the managing comprises, when receiving a retrieval request of individual content, providing content information including a content digit string registered for the content and further including at least one of a region, a keyword, a title, content, and a user contact address.

21. The information distribution method according to claim 15, after the managing, further comprising:

a connection relay charging step of receiving a connection request by receiving selection of a contact address of the content from the smart terminal having retrieved the information of the content, intermediating communication connection to the contact address, and charging for a cost of the connection intermediation.

22. The information distribution method according to claim 15, wherein the registering a content comprises further receiving registration of other content that is inserted in display information of the content to display link information and linked by selection of link information, for the content, as a relaying content.

23. The information distribution method according to claim 17, wherein the registering a content comprises receiving registration of at least one of a telephone number, an e-mail address, an Internet address and a SNS (Social Network Service) address as the contact address.

24. The information distribution method according to claim 23, wherein the registering a content comprises receiving registration of a plurality of telephone numbers of user, receiving registration of call connection ranking for each telephone number, and when a call connection to a first-ranking telephone number fails, making an automatic call connection to a second-ranking telephone number.

25. The information distribution method according to claim 22, after the managing, further comprising:

a connection relay rewarding step of rewarding of a predetermined cost to a high-level content user having registered the relaying content, when the content intermediated communication connection to a contact address by a connection request of the smart terminal is the relaying content linked by selection of the link information.

\* \* \* \* \*